United States Patent [19]

Frost et al.

[11] 4,138,817

[45] Feb. 13, 1979

[54] NAVIGATIONAL AID

[75] Inventors: Richard B. Frost, Eastwood; Joseph L. Juhasz, Georges Hall; Barry W. Wing, Hornsby, all of Australia

[73] Assignee: Unisearch Limited, Australia

[21] Appl. No.: 759,630

[22] Filed: Jan. 17, 1977

[30] Foreign Application Priority Data

Jan. 23, 1976 [AU] Australia .............................. 4607/76

[51] Int. Cl.[2] .............................................. G01C 21/20

[52] U.S. Cl. ..................................... 33/1 SD; 33/76 V

[58] Field of Search .............. 33/76 VA, 1 SD, 1 SB; 235/61 NV

[56] References Cited

U.S. PATENT DOCUMENTS

| | | | |
|---|---|---|---|
| 1,428,449 | 9/1922 | Prall | 33/76 VA |
| 1,917,278 | 7/1933 | Weems | 33/76 VA |
| 2,350,424 | 6/1944 | Smith | 33/76 VA |
| 2,449,342 | 9/1948 | Tardif | 33/76 VA |
| 2,753,112 | 7/1956 | Blom-Bakke | 33/76 VA |
| 3,735,100 | 5/1973 | Wagenfeld | 235/61 NV |

FOREIGN PATENT DOCUMENTS

| | | | |
|---|---|---|---|
| 135646 | 12/1919 | United Kingdom | 33/76 VA |
| 599260 | 3/1948 | United Kingdom | 33/76 VA |

*Primary Examiner*—Richard E. Aegerter
*Assistant Examiner*—John W. Shepperd
*Attorney, Agent, or Firm*—Steinberg & Blake

[57] ABSTRACT

A navigation aid consists of only three, namely first, second, and third indicia bearing members, the latter being respectively a transparent ground speed member bearing a ground speed scale having an origin, a transparent true air speed member bearing a true air speed scale having an origin, and a transparent wind speed and direction member bearing a wind speed scale and a wind direction indicator and having an origin, one of the first and second members bearing above the origin of its scale a compass rose which carries a drift scale which measures the angle between the ground speed scale and the true air speed scale, the three members lying in parallel juxtaposed planes, and only two connections being provided, one of the connections connecting two of the above members together at the origins of their scales by a connection having one rotational degree of freedom, and the other of the connections connecting the remaining member to one of the other two members at the origin of its scale by a connection having one translational degree of freedom and one rotational degree of freedom.

3 Claims, 4 Drawing Figures

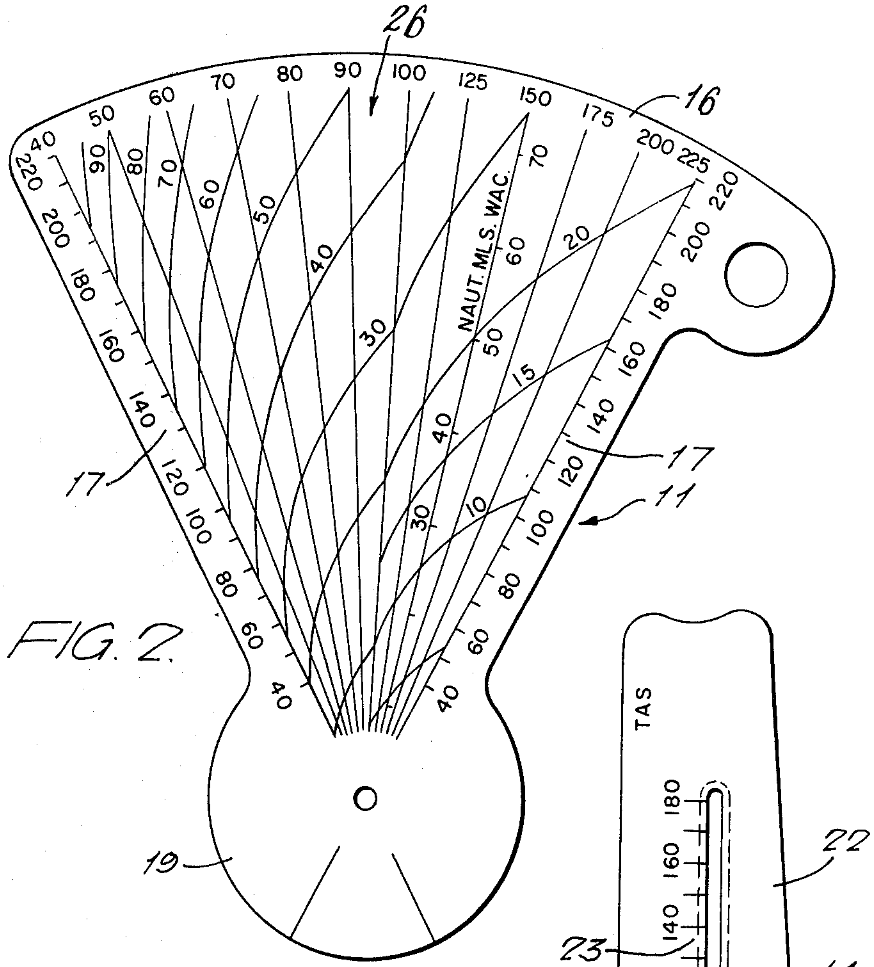
FIG. 2.
FIG. 4.
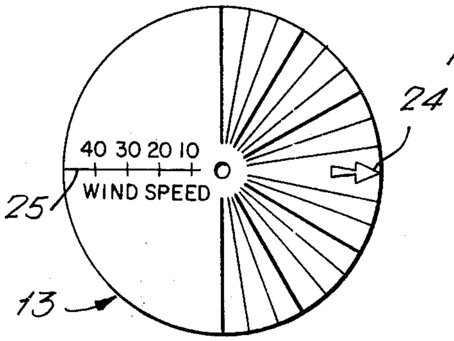
FIG. 3.
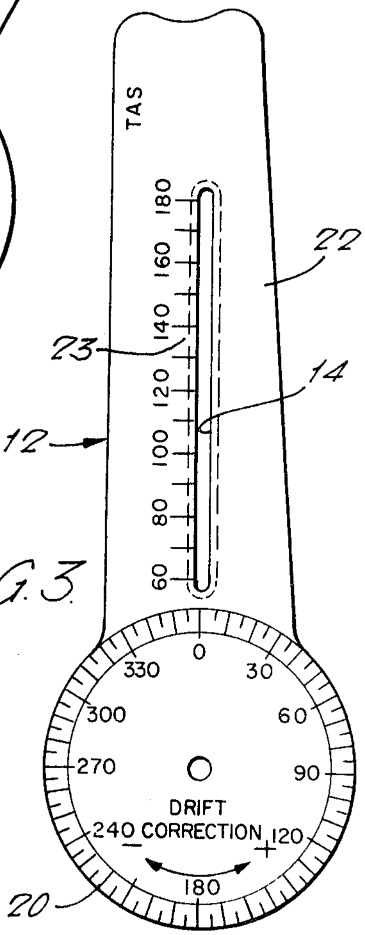

NAVIGATIONAL AID

The present invention relates to a navigation aid being a calculator consisting of three relatively movable scales which enabled the calculation of navigational vectors such as track velocity, heading of movement and angle of drift.

Light aircraft navigators are frequently called upon to calculate the extent of wind drift during motion or to calculate such things as track speed and heading when planning a flight. Such calculations using conventional instruments are time consuming and particularly difficult to carry out accurately when, for instance the calculations have to be made in the cockpit of a light aircraft for an emergency in flight diversion.

It is known from U.S. Pat. No. 2,433,249 to provide a navigational computer having ground speed, true air speed and wind speed scales and a wind direction scale and a drift scale, included in this device are nine separate and distinct indicia bearing members, six of which are required to be moved to perform even a simple navigational calculation as is described in example 2 of that specification. U.S. Pat. No. 2,350,424 relates to an aircraft navigation device which has the scales referred to above and can perform similar calculations. This latter device has six indicia bearing members of which four are required to perform a simple navigational calculation. The present inventors have substantially simplified these known devices without sacrificing their capacity to perform all the required navigational calculations. The present inventors have, by placing the compass rose about the origin of the ground speed scale or of the true air speed scale and by placing the wind speed scale and the wind direction indicator on a single member enabled all the required calculations to be performed by a device having only three indicia bearing members. As it has been the objective of previous inventors to produce simple navigation aids it will be seen that the present inventors contribution represents a substantial non-obvious advance over previously known navigation aids.

The present invention consists in a navigation aid having three indicia bearing members comprising a transparent ground speed member bearing a ground speed scale, a transparent true air speed member bearing a true air speed scale, and a transparent wind speed and direction member bearing a wind speed scale and a wind direction indicator, the ground speed member or the true air speed member bearing about the origin of its scale a compass rose which defines a drift scale which measures the angle between the ground speed scale and the true air speed scale, the three members lying in parallel juxtaposed planes and two of them being connected together at the origins of their scales by a connection having one rotational degree of freedom, the third member being connected to one of the other two members at the origin of its scale by a connection having one translational degree of freedom and one rotational degree of freedom.

The ground speed member or the true air speed member preferably bears a further scale representing a time, speed and distance grid which shares a common origin with the ground speed scale or the true air speed scale as the case may be. The time, speed and distance grid is preferably shaped as a sector of a circle and both of the radial edges of the grid are preferably bounded by a ground speed scale or by a true air speed scale as the case may be.

The compass rose is preferably borne by the true air speed member, the drift angle being read at the intersection of the compass rose and an extension of the ground speed scale which extends backwards beyond the origin of that scale.

The third member of the navigation aid is preferably connected to one of the other members such that it may be restrained against translational movement while leaving it free to perform rotational movement.

Hereinafter given by way of example only is a preferred embodiment of the invention described with reference to the accompanying drawing in which:

FIG. 2 is a plan view of the ground speed member of the navigation aid of FIG. 1., FIG. 3 is a plan view of the true air speed member of the navigation aid of FIG. 1, and FIG. 4 is a plan view of the wind speed and direction member of the navigation aid of FIG. 1.

Figure 1:
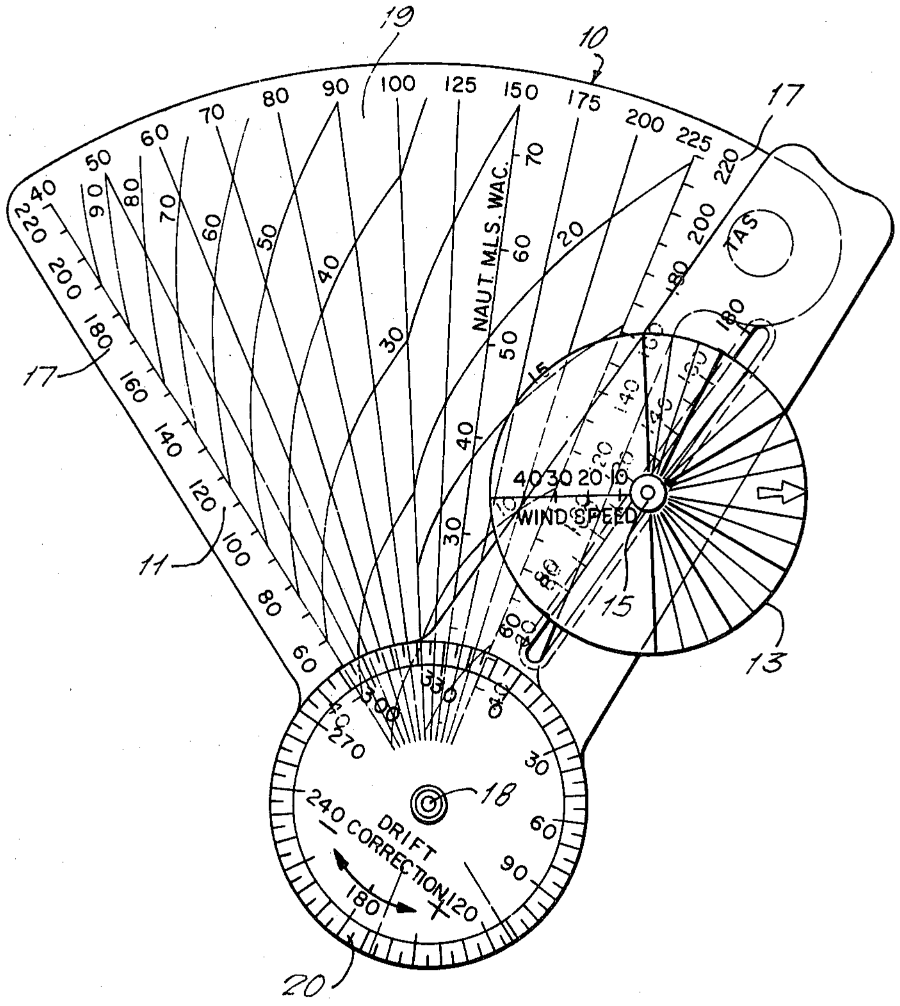
FIG. 1 is a plan view of a navigation aid according to the present invention.

The navigation aid comprises a ground speed member 11, bearing a ground speed scale 17, which is pivotably connected, at the zero point, or origin, of the ground speed scale, to a true air speed member 12, which bears a true air speed scale 23. A wind speed and direction member 13 is mounted on a pin 15 which is slidable in a longitudinally extending slot 14 in the true air speed member 12, and is rotatable about the pin 15.

The ground speed member 11 is formed from a sheet of a transparent plastics material having the shape of an opened fan. The larger portion, hereinafter referred to as the fan portion 19, of the ground speed member 11 bears a pair of ground speed scales 17 which each extend along one marginal edge of the fan portion 16 and originate at the pivot 18 which interconnects the ground speed member 11 and the true air speed member 12. The smaller portion of the ground speed member, hereinafter called the tail portion 19, carries extensions of the ground speed scales which serve, together with a compass rose 20 which forms part of the true air speed scale 12, to provide a reading for the wind offset or drift for use in the correction of the heading to allow for the wind.

The true air speed member 12 comprises the compass rose 20, which is pivoted at its centre to the ground speed member 11, and an elongate slotted arm 22 which carries the true air speed scale 23 which also has as its origin the pivot 18. The wind speed and direction member 13 comprises a disc rotatably mounted at its centre on the pin 15 which is slidable along the slot 14 as has been described above. The wind speed and direction member 13 carries a wind direction indicator 24 and a wind speed scale 25 which are in linear alignment. The pin 15 is so constructed that the wind speed and direction member 13 may be clamped relative to the true air speed member 11 while still allowing rotational movement of the member 13.

The fan portion 16 also carries a flight leg time scale 26 which can be used, in conjunction with a map of an appropriate scale, to determine the time that a given flight will take at a given track speed. This scale 26, consists of a series of radial lines radiating from the pivot 18, each corresponding to a particular track speed, and intersected by a series of constant time curves.

In use the navigation aid 10 may be used either to find the wind vector in flight, or to find the track speed, heading and duration of flight between two known points either for flight planning or in-flight diversion.

To find the wind vector in flight it is necessary to know the constant heading and true air speed between two known points.

The following procedure then followed:

(1) The wind speed and direction member 13 is positioned at the correct value of the true air speed on the true air speed scale 23 by sliding the pivot pin 15 to the appropriate point along the slot 14. It might be noted here that the true air speed may be obtained in flight by applying the appropriate altitude density correction to the reading obtained from the air speed indicator in aircraft.

(2) The elapsed flight time between two known positions on the map is established.

(3) The compass rose 20 is centered over the first of these known positions and the flight leg time scale 26 used to determine the ground speed in knots.

(4) With the compass rose 20 still centered over the first known position the slot 14 and one of the ground speed scales 17 are aligned in the true North-South direction on the map.

(5) While holding the ground speed member 11 stationary the true air speed member 13 is rotated by the amount of the local magnetic variation. The slot 14 will now be aligned in a magnetic North-South direction. The ground speed scale 17 is now re-aligned with the slot 14 while holding the true air speed member 12 stationary. The ground speed scale is thereby also aligned in a magnetic North-South direction.

(6) The true air speed member 12 is rotated so that the true air speed scale 23 extends in the direction of the magnetic heading between the two known points, as shown by the position of the true air speed scale 23 on the compass rôse 20.

(7) The ground speed member 11 is then rotated so that the ground speed scale 17 lies along the track between the two known points.

(8) Holding the ground speed member 11 and the true air speed member 12 stationary the wind speed and direction member 13 is rotated so that the wind speed scale 25 intersects the ground speed scale 17 at its correct value. The wind speed scale 25 will then provide a reading of the wind speed and the true wind direction, to the nearest 10°, may be determined from the wind direction indicator's position relative to the grid lines on the map.

To find track speed, heading and duration of a flight between two points the following procedure is followed:

(1) The wind speed and direction member 13 is centered at the proposed true air speed on the true air speed scale 23.

(2) The compass rose 20 is centered over the starting point and the slot 14 and the ground speed scale 17 are aligned in a true North-South direction on the map.

(3) The true air speed member 12 is rotated by the amount of the local magnetic variation so that the slot 14 is aligned in a magnetic North-South direction.

(4) The ground speed member 11 is then rotated until the ground speed scale 17 lies over the required ground path on the map. The magnetic ground path may then be read from the compass rose 20 against the ground speed scale.

(5) The true air speed member 12 is now rotated simultaneously with the wind speed and direction member 13 so that the direction arrow 24 on the air speed and direction member 13 is aligned in the proper, known, true wind direction and the ground speed scale 17 intersects the wind speed scale 25 at the correct value of wind speed. The value of the ground speed may be read from the ground speed scale 17 while the wind offset or drift may be read from the far side of the compass rose against the ground speed scale extension appearing on the tail portion 19.

(6) The value of the wind offset or drift is added (for off-set to right) or subtracted (for offset to left); as shown by, + and − signs at the arrowhead marked on the compass rose 20.

(7) The ground speed scale 26 on the ground speed member 11 may be used, in conjunction with the map, to find the duration of the flight between the two points.

We claim:

1. A navigation aid consisting of only three transparent indicia bearing members and only two connecting means comprising:

a first member having a pair of radially extending side edges defining the shape of a sector of a circle, said first member bearing a time, speed and distance grid wherein the lines defining said grid intersect at an origin, said first member further including a first speed scale extending along one of said radial sector edges having an origin coincident with said origin;

an elongate second member bearing a second speed scale adjacent a longitudinal slot formed therein, said second speed scale having an origin, said first and second members being pivotally interconnected by first connecting means at the point of their respective origins, and the second member extending radially outwardly from said point of pivotal interconnection at least substantially to the radial extremity of the first member;

said first and second members having drift scale indicia means provided integrally thereon for indicating the angle between said first and second speed scales; and a third member bearing a wind speed scale and a wind direction scale, said third member being connected by second connecting means to said second member within said slot such that it may be rotated and moved longitudinally with respect to said second member.

2. A navigation aid as recited in claim 1 wherein said first speed scale comprises a ground speed scale and said second speed scale comprises a true air speed scale and wherein said drift scale indicia means comprises a compass rose integrally formed on said second member having a center coincident with said respective origins of said first and second speed scales and indicia comprising an extension of said ground speed scale integrally formed on said first member on the opposite side of said origin from said ground speed scale.

3. A navigation aid as recited in claim 1 wherein said second connecting means comprises means for selectively restraining said third member against translational movement while leaving it free to perform rotational movement.

* * * * *